US012688331B2

(12) United States Patent
Boynton et al.

(10) Patent No.: US 12,688,331 B2
(45) Date of Patent: Jul. 21, 2026

(54) DATA PROCESSING SYSTEM AND METHOD FOR MASKING SENSITIVE DATA

(71) Applicant: ACCENTURE GLOBAL SOLUTIONS LIMITED, Dublin (IE)

(72) Inventors: Paul Boynton, Encinitas, CA (US); Arash John Rahmani, San Diego, CA (US); Ibrahim Al-Shyoukh, Loma Linda, CA (US); Vijay Desai, San Diego, CA (US); Revathi Subramanian, San Diego, CA (US); Atefeh Morsali, Irvine, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 64 days.

(21) Appl. No.: 18/818,151

(22) Filed: Aug. 28, 2024

(65) Prior Publication Data

US 2025/0077708 A1    Mar. 6, 2025

Related U.S. Application Data

(60) Provisional application No. 63/535,624, filed on Aug. 31, 2023.

(51) Int. Cl.
 G06F 21/00 (2013.01)
 G06F 21/62 (2013.01)
(52) U.S. Cl.
 CPC .. G06F 21/6254 (2013.01); G06F 2221/2113 (2013.01); G06F 2221/2141 (2013.01)

(58) Field of Classification Search
 CPC ......... G06F 21/6254; G06F 2221/2113; G06F 2221/2141; G06F 21/6245
 See application file for complete search history.

(56) References Cited

U.S. PATENT DOCUMENTS

| 2022/0012244 A1 * | 1/2022 | Wang | G06Q 30/02 |
| 2023/0017396 A1 * | 1/2023 | Weerasinghe | G06F 21/6227 |
| 2024/0291863 A1 * | 8/2024 | Cohen | H04L 63/1491 |

FOREIGN PATENT DOCUMENTS

| JP | 2013537332 A | 9/2013 |
| JP | 2021503117 A | 2/2021 |
| WO | 2008126149 A1 | 10/2008 |

OTHER PUBLICATIONS

Zhu, et al., "Efficient and Privacy-Preserving Proximity Detection Schemes for Social Applications," in IEEE Internet of Things Journal, vol. 5, No. 4, pp. 2947-2957, Aug. (Year: 2018).*

(Continued)

*Primary Examiner* — Morshed Mehedi
(74) *Attorney, Agent, or Firm* — Mannava & Kang, P.C.

(57) ABSTRACT

Method, data processing system, and computer-readable storage media for responding to a user query. Receiving query from user, query pertaining to request for information. Based on query, generate prompts by masking sensitive information in query. Receive responses from foundation models in response to inputting prompts. Based on responses, generate common result set. By validating common result set with sensitive information, generate response. By supplementing response with sensitive information, generate user response. Providing user response in response to query to the user.

20 Claims, 7 Drawing Sheets

(56)                    References Cited

OTHER PUBLICATIONS

Ryck et al., "Protected Web Components: Hiding Sensitive Information in the Shadows," in IT Professional, vol. 17, No. 1, pp. 36-43, Jan.-Feb. (Year: 2015).*

Machine English translation of "Notice of Reasons for Refusal for Japanese Patent Application No. JP2024147536", dated Sep. 2, 2025, 3 pages.

Ubaid Ur Rehman, Musarrat Hussain, Tri D.T. Nguyen, Sungyoung Lee, "Let's Hide from LLMs: An Adaptive Contextual Privacy Preservation Method for Time Series Data", AICCC'23, Dec. 16-18, 2023, Kyoto, Japan, pp. 196-203.

Amy Winograd,"Loose-Lipped Large Language Models Spill Your Secrets: the Privacy Implications of Large Language Models", Harvard Journal of Law & Technology, vol. 36, No. 2 Spring 2023, pp. 616-655.

Amar Kanagaraj, "How to Preserve Data Privacy in LLMs in 2024", Protecto, Blog, Aug. 19, 2024, 7 Pages <https://www.protecto.ai/blog/how-to-preserve-data-privacy-in-llms>.

Yuki Kinebuchi, Shakeel Butt, Vinod Ganapathy, Liviu Iftode, Tatsuo Nakajima, "Monitoring Integrity Using Limited Local Memory", IEEE Transactions on Information Forensics and Security, vol. 8, No. 7, Jul. 2013, pp. 1230-1242.

* cited by examiner

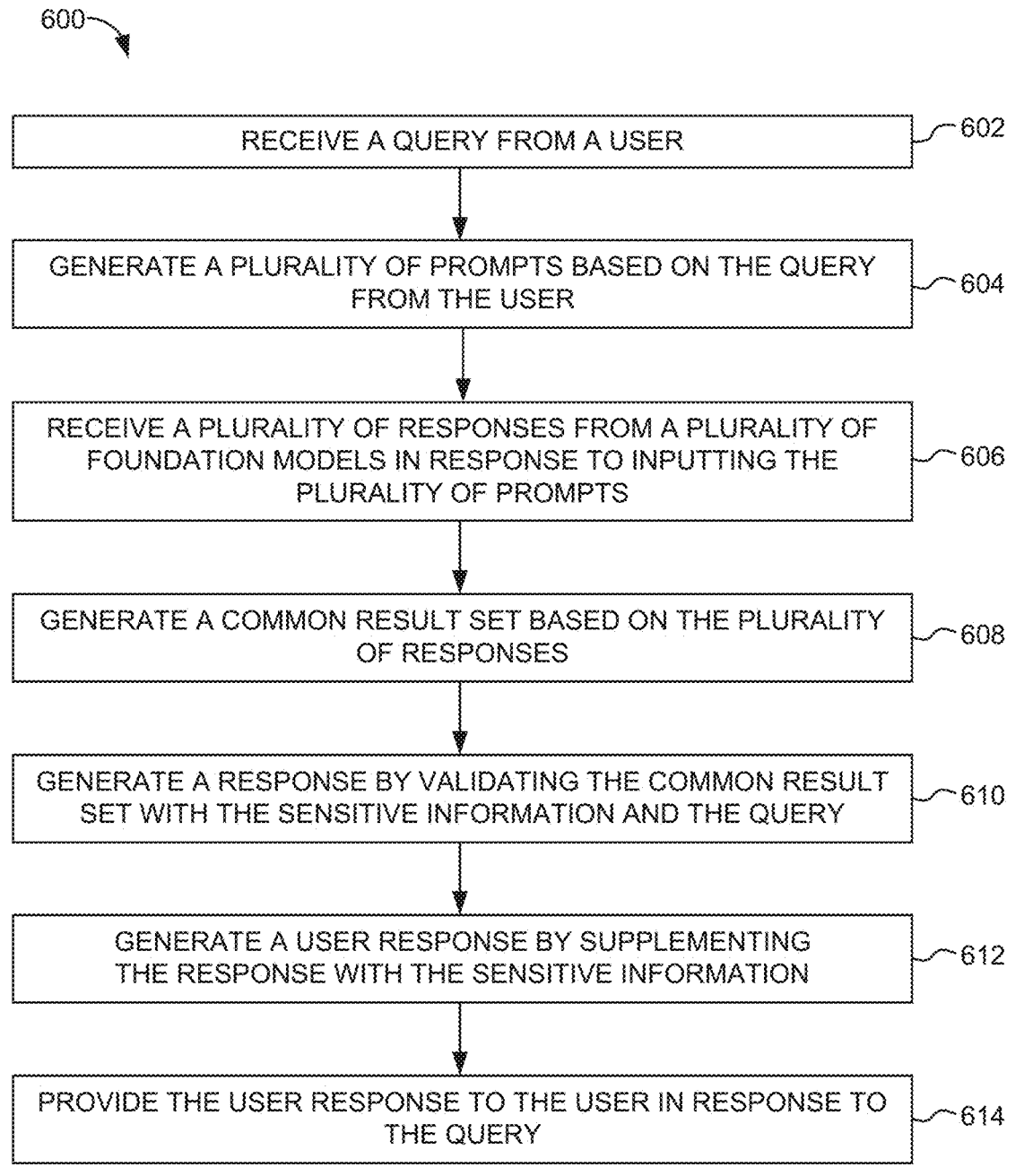

600

RECEIVE A QUERY FROM A USER — 602

GENERATE A PLURALITY OF PROMPTS BASED ON THE QUERY FROM THE USER — 604

RECEIVE A PLURALITY OF RESPONSES FROM A PLURALITY OF FOUNDATION MODELS IN RESPONSE TO INPUTTING THE PLURALITY OF PROMPTS — 606

GENERATE A COMMON RESULT SET BASED ON THE PLURALITY OF RESPONSES — 608

GENERATE A RESPONSE BY VALIDATING THE COMMON RESULT SET WITH THE SENSITIVE INFORMATION AND THE QUERY — 610

GENERATE A USER RESPONSE BY SUPPLEMENTING THE RESPONSE WITH THE SENSITIVE INFORMATION — 612

PROVIDE THE USER RESPONSE TO THE USER IN RESPONSE TO THE QUERY — 614

FIG. 6

DATA PROCESSING SYSTEM AND METHOD FOR MASKING SENSITIVE DATA

PRIORITY

This application is a non-provisional application of the U.S. provisional patent application bearing Ser. No. 63/535, 624, entitled "Data Processing for Generative Artificial Intelligence (AI) Models", filed on Aug. 31, 2023, the entirety of which is incorporated herein by reference.

BACKGROUND

In modern data management systems, ensuring the security and confidentiality of sensitive information during interactions with third-party platforms such as foundation models is paramount. There is a growing emphasis on protecting sensitive data from unauthorized access or exposure while facilitating seamless data retrieval and presentation processes. Addressing these challenges highlights the continuous demand for robust frameworks that can protect sensitive information, ensuring its integrity and confidentiality are preserved throughout various interactions between a user and the platforms.

SUMMARY

The present disclosure generally relates to the field of data processing, and more particularly to a data processing system and a method for masking sensitive data for fetching information from foundation models.

Implementations of the present disclosure are generally directed to masking sensitive data while retrieving information. The sensitive information is identified and masked before a request for information reaches a third-party tool, ensuring that enterprise data remains safe within the enterprise environment. Advantageously, the sensitive data is masked in a manner that the contextual and relational relevance within the sensitive data are retained. This ensures that the external tool provides accurate and relevant responses, without gaining access to the sensitive information. The external tool may be implemented as an external foundation model. Leveraging masked sensitive data for information retrieval reduces computational time required, and without compromising accuracy. Thereby, the proposed system and method transforms the field of foundation models, by securing sensitive data from external/third-party tools implementing the said foundation models without compromising on the accuracy of the model outputs.

In general, innovative aspects of the subject matter described in this specification provide a data processing system. The data processing system includes, at least one processor and at least one non-transitory processor-readable medium storing instructions to be executed by the at least one processor. The at least one processor is configured to receive a query from a user, the query pertaining to a request for information, generate a plurality of prompts based on the query from the user, the plurality of prompts being generated by masking sensitive information in the query, receive a plurality of responses from a plurality of foundation models in response to inputting the plurality of prompts, generate a common result set with the sensitive information and the query, generate a user response by supplementing or supplementing the response with the sensitive information, and provide the user response to the user in response to the query.

The present disclosure further describes a method for masking sensitive data during information retrieval. The present disclosure also describes non-transitory processor readable storage medium coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various embodiments in accordance with the present disclosure will be described with reference to the drawings, in which:

FIG. 6 is a flow diagram presenting an exemplary method in accordance with implementations of the present disclosure.

Like reference numbers and designations in the various drawings indicate like elements.

DETAILED DESCRIPTION

Figure 1:
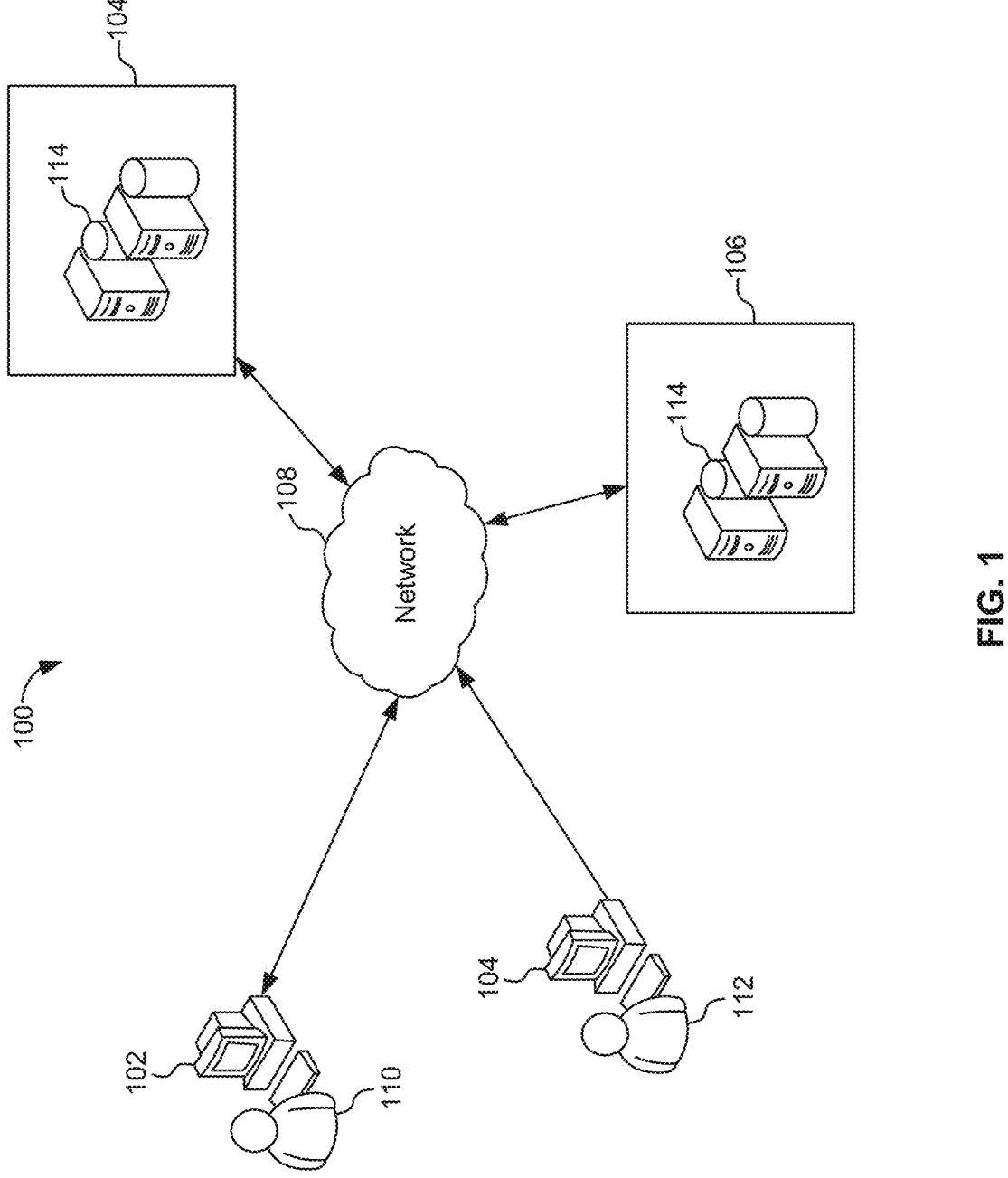
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, systems, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

The advent of new-age third-party tools and platforms such as foundation models, presents both opportunities and challenges in securing sensitive information. The conventional tools and platforms leverage advanced algorithms and data processing techniques to enhance the accuracy and relevance of retrieved data. Despite the advancements, the integration of sensitive data with such tools introduces inherent risks, including unauthorized access and potential data breaches, which necessitate robust security measures.

Conventional methods of securing sensitive information during interactions with any tool or platform, such as foundation models, have typically relied on encryption and access control mechanisms. However, such approaches often face challenges in ensuring comprehensive protection against unauthorized access or inadvertent exposure. As digital ecosystems evolve and data interactions become increasingly complex, there is a need for robust security frameworks that can effectively mask or obscure sensitive information from external entities.

Recent advancements in cybersecurity have underscored the vulnerabilities inherent in conventional security measures while interfacing with external systems. The incorporation of advanced masking techniques and secure communication protocols has become indispensable for mitigating risks and safeguarding sensitive data during information retrieval and presentation processes. Historically, masking sensitive information has often involved methods such as removal or substitution with generic variables, which can result in erroneous responses and unreliable data outputs commonly referred to as hallucinations, undermining the reliability of retrieved data.

Furthermore, the proliferation of interconnected digital platforms and the rise of distributed computing paradigms have exacerbated the complexities surrounding data security and privacy. The seamless integration of secure masking techniques has to be ensured while maintaining the efficiency and accuracy of information retrieval operations. Addressing such challenges requires innovative approaches that enhance the security posture of data interactions while adhering to regulatory requirements and industry standards governing data protection.

Implementations of the disclosed subject matter involve generating responses to a user query and generating multiple prompts by masking sensitive information within the query. The generated multiple prompts are then used to aggregate responses from various foundation models. Then a common result set is generated from the aggregated responses, and the common result set is validated against the user query (original query received from the user) and sensitive information. Subsequently, a user response is formulated, integrating the validated information, and the response is provided to the user as a coherent response to the user query. Such an approach maintains data security and privacy without compromising the accuracy and reliability of the model outputs.

FIG. 1 depicts an example environment 100 that may be used to execute implementations of the present disclosure. In some examples, the example environment 100 enables masking of sensitive information when retrieving information for a user query.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications according to implementations of the present disclosure. Examples of the computing devices 102 and 104 may include desktop computing devices, smartphones, laptops, tablet, voice-enabled devices, and/or the like. It is contemplated that implementations of the present disclosure may be realized with any appropriate type of computing device. In some examples, each of the computing devices 102 and 104 may include a web browser application executed thereon, which may be used to display one or more web pages of a computing platform executing applications. In some examples, each of the computing devices 102 and 104 may display one or more Graphical User Interfaces (GUIs) that enable the respective users 110 and 112 to interact with the computing platform.

In some examples, the network 108 includes a Local Area Network (LAN), a Wide Area Network (WAN), the Internet, or a combination thereof, and connects web sites, the computing devices 102 and 104, and the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example: cloud or on-demand) that is operated by an enterprise or a third-party on behalf of an enterprise. In some examples, one or more of the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more data processing systems 114 to host components (for example, knowledge embeddings) for information retrieval. Further, the data processing system 114 accepts requests from the users 110 and 112 through the respective computing devices 102 and 104 for services being provided by the data processing system 114. In response to the accepted requests, the data processing system 114 provides the requested services to the computing devices 102 and 104 over the network 108. The requests received from the users 110 and 112 through the respective computing devices 102 and 104 may be user queries. The data processing system 114 may enable utilizing a plurality of foundation model while masking the sensitive data from the plurality of foundation models, ensuring generation of accurate responses to queries by the users 110 and 112, without compromising on data security. The interaction between the data processing system 114 and users 110, 112 may be conversational in nature, including conversational queries as well as conversational responses to the queries.

According to implementations of the present disclosure, the data processing system 114 may be configured for masking the sensitive data during the user's interaction with the foundation models, while ensuring accuracy in information retrieval. Numerous examples depicting the masking of sensitive data to ensure data security while retrieving information are described in detail in conjunctions with figures below.

Figure 2:
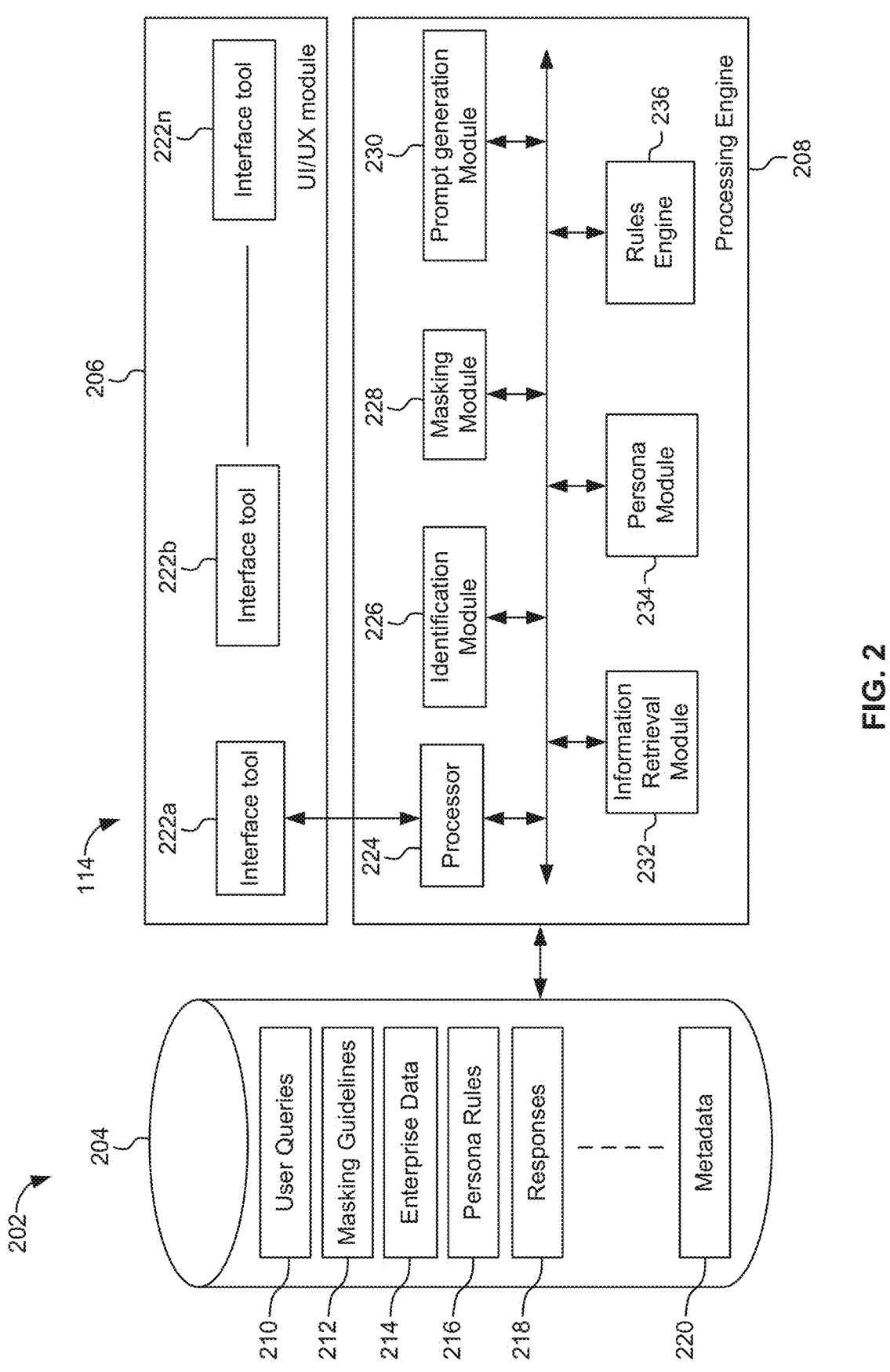
FIG. 2 depicts an example architecture of a data processing system for masking sensitive data during information retrieval in accordance with implementations of the present disclosure.

FIG. 2 depicts an example architecture 202 of the data processing system 114 for masking sensitive data during information retrieval in accordance with implementations of the present disclosure. In an example, as depicted in FIG. 2, the data processing system 114 receives one or more queries and generates content/responses to the one or more queries. The responses may include but are not limited to, text, images, audio, video, and/or the like, in response to the queries. The one or more queries may include prompts for generation of responses to queries pertaining to the world or specific systems or enterprise or business, etc. It is to be noted that the generated responses may include additional information, feedback/inputs, and/or the like required for answering the query.

The data processing system 114 includes a knowledge base 204, a User Interface (UI)/User Experience (UX) module 206, and a processing engine 208. The knowledge base 204 may be described as a structured repository or database associated with the data processing system 114. The knowledge base 204 may incorporate various knowledge representation schemes, such as ontologies, taxonomies, or semantic networks, to encode and organize information in a machine-understandable format, thereby enabling advanced search, inference, and reasoning capabilities. Furthermore, the knowledge base 204 may leverage advanced technologies, including natural language processing, machine learning, and knowledge engineering techniques, to enhance knowledge acquisition, update, and refinement processes, ensuring its continual relevance and adaptability to evolving needs and circumstances.

In one embodiment of the present disclosure, the knowledge base 204 is stored with user queries 210, masking guidelines 212, enterprise data 214, persona rules 216, responses 218, metadata 220, information pertaining to an enterprise or business, and additional information (not shown) pertaining to the data processing system 114. The user queries 210 refer to one or more queries received from the user. The user queries 210 may pertain to requests for obtaining answers or responses by processing information related to an enterprise. Additionally, the user queries 210 may include sensitive information.

The masking guidelines 212 may be described as guidelines or techniques pertaining to sequential steps and decision-making processes involved in masking sensitive data in user queries 210. Examples of the masking guidelines/techniques 212 include an anonymization technique, a tokenization technique, a data scrambling technique, Dynamic Data Masking (DDM), format-preserving encryption technique, static data masking technique, and the like.

The enterprise data 214 may include information that encompasses data, facts, and insights derived from various data sources related to the enterprise. Such information may be organized in a coherent manner to support decision-making, problem-solving, and system operations within the data processing system 114. The enterprise data 214 may be temporal, numeric, and/or textual.

The enterprise data 214 includes enterprise information, which is represented across hierarchies and incorporates domain terminology. Hierarchies refer to structured levels or layers within organizational data, defining relationships and classifications from broader categories to specific details. Examples of the hierarchies may include organizational structure levels (departments, teams, roles, and the like), product categorization (categories, sub-categories, products, and the like), geographic segmentation (regions, countries, cities, and the like). Domain terminology refers to specialized language, vocabulary, or jargon specific to particular fields or industries, facilitating precise communication and understanding within those contexts. Examples of the domain terminologies may include medical terminology (diagnosis, treatment, patient care, and the like), legal terminology (for example, jurisdiction, litigation, contracts, and the like), financial terminology (assets, liabilities, dividends, and the like).

In this regard, the enterprise data 214 may be stored across a plurality of sub-databases within the knowledge base 204, such that each of the plurality of sub-databases pertain to a domain or solution pertaining to the enterprise. For example, a HR database for HR domain, a fraud database for fraud prevention domain, a collections database, a contract financial management database, and the like. Each of the plurality of sub-databases may have specific data tables with relational interactions based on specific data stored within each of the sub-databases.

The persona rules 216 refer to rules pertaining to accessibility of information with respect to user personas. For example, a developer may not necessarily need to have access to employment-related information of other employees, which a manager or a human resources employee may have access to. The responses 218 refer to responses to queries, generated either by the plurality of foundation models, or by the data processing system 114. The responses 218 may include answers to the user query. The metadata 220 may be described as descriptive information pertaining to the data including, user queries 210, masking guidelines 212, enterprise data 214, persona rules 216, and responses 218, stored within the knowledge base 204. Additionally, each query and response may have associated metadata, which provides context to the query or response, thereby improving accuracy of responses 218.

Additionally, the knowledge base 204 includes additional data, for example, raw data pertaining to the enterprise. The raw data may be utilized for training purposes. Typically, the raw data includes hierarchies, labels, categorical variables, and the like. Such components of the raw data provide insights pertaining to the data, based on which, specific masking techniques may be implemented, based on each scenario of masking the sensitive data.

The UI/UX module 206 may be defined as a module which designs and manages a user interface (UI), using which the user interacts with the data processing system 114, and the user's experience (UX) during the interaction. The UI/UX module 206 may integrate various technologies and frameworks to optimize visual layout, interactive elements, and overall usability, often utilizing principles of human-computer interaction (HCI) and graphic design.

In some examples, the UI/UX module 206 may represent one or more front-end components/interfaces 222a-222n of a chatbot that may be executed on one or more of the computing devices 102 and 104 to enable receipt of the user queries and providing one or more user responses to the user queries. In some examples, the user query may be received through various modalities including, but not limited to, a question input to a chat bot, a request provided through a Graphical User Interface (GUI), an email, and/or the like.

The processing engine 208 is configured for processing the queries received through the UI/UX module 206 using a plurality of foundation models. The foundation models may be described as a general-purpose Generative Artificial Intelligence (GAI) model like large deep learning neural network. The large deep learning neural network may be trained using broad range of generalized, unlabeled training data and that may perform a multitude of general tasks. Examples of the tasks may include generating text, generating images, conversing in natural language, generating video, generating audio, and/or the like. In some examples, the applications may be built to interact with the foundation models. In some examples, multiple foundation models may be used to perform a range of functionality for an application.

The foundation models may include, for example, Large Language Models (LLMs), which are a form of GAI that may be used to generate text for a variety of use cases. In some examples, the LLMs may be integrated with digital assistants (for example: chatbots), replacing traditional rule-based systems to provide textual responses to a user input/query. An LLM may be described as an advanced language model that is trained using deep learning techniques on vast amounts of text data. The LLMs typically generates human-like text and perform various Natural Language Processing (NLP) tasks (for example, translation, question-answering, and/or the like). In some examples, the LLM refers to models that use deep learning techniques and have a plurality of parameters. The LLMs typically captures complex patterns in language and produce text that is often indistinguishable from that written by humans. The produced text may be processed through a deep learning architecture such as, recurrent neural network (RNN), a transformer model, and/or the like.

While implementations of the present disclosure are described in further detail with non-limiting reference to the LLMs as the example foundation models, it is contemplated that implementations of the present disclosure may be realized using any appropriate foundation models or Machine Learning (ML) models, or Artificial Intelligence (AI) models. Such models may generate the content/response based on any appropriate modality (for example, text, audio, image, video, and/or the like). In some examples, the response may correspond to the one or more task being represented by the conversational queries.

In some examples, the foundation models may be provided by one or more third parties. In some examples, the foundation models may be provided via the data processing system 114. The foundation model receives requests/queries and provide responses to the queries. For example, questions/information requests may be received as queries through an Application Programming Interface (API).

The processing engine 208 includes one or more processors 224, an identification module 226, a 228, a prompt generation module 230, an information retrieval module 232, a persona module 234, and a rules engine 236.

The processor 224 may include, for example, microprocessors, microcomputers, microcontrollers, digital signal processors, central processing units, state machines, logic circuits, and/or any devices that manipulate data or signals based on operational instructions. Among other capabilities, the processor 224 is configured to fetch and execute computer-readable instructions in a memory operationally coupled with the data processing system 114 for masking the sensitive information.

The identification module 226 identifies sensitive information within and pertaining to the user queries 210. Prior to deployment, the identification module 226 is trained using the raw data. The raw data includes details like hierarchies, labels, categorical variables, and the like, and the identification module 226 inherently understands relationships between different data points within the raw data. The identification module 226 understands at least one of: a linear relationship between the different data points, a non-linear relationship between the different data points. Advantageously, understanding non-linear relationships enables the identification module 226 to identify relevant sensitive information in a fast and accurate manner. Here, the identification module 226 may utilize a plurality of relationship identification techniques for identifying the sensitive information, including a statistical correlation technique, a pearson correlation technique, an ontological correlation technique, and the like. This allows the identification module 226 to have a detailed understanding of the enterprise data 214. On deployment, the identification module 226 identifies the sensitive information using fuzzy matching.

Fuzzy matching refers to a technique used for information retrieval and data validation processes where approximate matching is allowed, accommodating variations such as misspellings, synonyms, or similar patterns without exact matches. For example, if the enterprise data 214 comprises customer names "Smith & Co.", the identification module 226 may match it with similar entries such as "Smith and Company" or "Smith & Company," leveraging fuzzy matching techniques to consolidate and manage customer information effectively. Thereafter, the identification module 226 provides the sensitive information identified, along with relational details pertaining to the sensitive information from the enterprise data 214 to the masking module 228.

The masking module 228 masks the sensitive information identified by the identification module 226 in the user queries 210. The masking module 228 utilizes one or more masking techniques, or masking guidelines 212 to mask the sensitive information. The one or more masking techniques/guidelines 212 are selected based on the identified sensitive information, and its correlation and context with respect to the enterprise data 214.

The masking module 228 masks the sensitive information using various techniques such as but not limited to, anonymizing the sensitive data, replacing the sensitive information with contextual and correlational variables, obfuscation of ranges, etc., which ensure data privacy while leveraging accurate responses from the plurality of foundation models. For example, if the sensitive information identified in the user query 210 is a term "North America", the masking module 228 may replace the term with "first American region", such that the aspect of the region being in America is retained, without the specificity which affects privacy. In this way, the masking module 228 generates a masked query by masking the sensitive information in the query. The variables utilized in place of the sensitive information retains contextual and relational relevance, ensuring that the responses generated in responses to the masked query are accurate.

Upon masking the sensitive information in the user query, the prompt generation module 230 generates a plurality of prompts for retrieving information from a plurality of foundation models. The plurality of prompts is generated based on the masked query generated by the masking module 228. Advantageously, the prompt generation module 230 generates the plurality of prompts, which reiterate the user query in different manners of natural language, so as to ascertain accuracy and completeness of the responses received from the plurality of foundation models.

Typically, foundation models often hallucinate and provide contradictory answers, which results in inaccurate responses, unfit for use. Functions of the prompt generation module 230 provide a solution for such hallucinations, since providing the plurality of prompts makes the plurality of foundation models question themselves, such that responses provided are vetted against each other. For example, if the user query is "What is the sales projection for California team", the masked query might be "What is the sales projection for first US team", and the prompt generation module 230 may generate related prompts such as "please provide sales projection for first US team", "first US team sales projection 2025 Q1", "sales projection US teams for FY25", and the like.

On receiving the plurality of prompts, the information retrieval module 232 retrieves relevant information from the knowledge base 204 as well as the plurality of foundation models to generate the user response. In one embodiment, the information retrieval module 232 utilizes the plurality of foundation models to generate responses to the plurality of prompts. In some instances, all of the plurality of prompts are provided to each of the plurality of foundation models. In other instances, one or more of the plurality of prompts may be provided to each of the plurality of foundation models. In operation, any permutation or combination of the plurality of prompts and the plurality of foundation models may be implemented by the information retrieval module 232.

Further, the information retrieval module 232 retrieves relevant corresponding information from the enterprise data 214 to supplement the plurality of responses. The enterprise data 214 comprises the sensitive information pertaining to the query. Additionally, the enterprise data 214 may include sensitive information related to any enterprise, operation, service, facility, or the like. In an example, if the data processing system 114 is utilized by a government, the enterprise data 214 (and, in extension, the sensitive information) may relate to voters database, population information, citizen details, and the like. In another example, if the present data processing system 114 is utilized by a hospital, the enterprise data 214 (and, in extension, the sensitive information) may relate to medical records, healthcare information, identification information, and the like.

Since the enterprise data 214 includes hierarchies and domain terminologies, when unmasking the response to generate the user response, the information retrieval module 232 maps the domain terminology to the plurality of foundation models. During pre-processing, the identification module 226 trains/tunes the plurality of foundation models based on a plurality of domain terminologies. The identification module 226 may train individual foundation models for each domain. For example, the identification module 226 may train/tune a first foundation model on a medical domain, and train a second foundation model on an aerospace domain. The identification module 226 may utilize one or more training techniques for training/tuning the foundation models. The one or more training techniques includes a supervised finetuning technique, a feedback technique, a reinforcement learning technique, a human-feedback reinforcement learning, and the like.

Further, the identification module 226 generates an index comprising mapping of the plurality of foundation models and the domain terminologies/domains that each of the plurality of foundation model has been trained/tuned on. In relation to the previous example, the index may comprise a mapping of the first foundation model with the medical domain, and a mapping of the second foundation model with the aerospace domain. The index may be implemented as at least one of a vector index, a one-to-many index, a hash map index, a one-to-one index. During unmasking of the response, the information retrieval module 232 maps the domain terminology to the plurality of foundation models based on the index.

Additionally, the information retrieval module 232 receives the plurality of responses and generates common result set. The common result set refers to a common set of responses amongst the plurality of responses received from the plurality of foundation models. For example, to the query "what would be the annual revenue growth for this fiscal year?," if the plurality of responses received are: +7%, +5%, +2%, −2%, +1%, +5%, +7%, +1%, +5%. Here, positive numbers represent growth in the projected annual revenue, whereas negative numbers represent loss. Moreover, the information retrieval module 232 may identify the common result set based on a number of occurrences of a specific response. With respect to the present example, since the response '+5%' is selected as the common result set since it is repeating a maximal number of times. A simple example has been taken to illustrate how the common result set is generated. Notably, actual implementations may vary in complexities based on the user query 210.

Thereafter, the information retrieval module 232 validates the common result with the sensitive information. When supplemented with the sensitive information, the information retrieval module 232 validates the common result by identifying if the common result set stands true in light of the sensitive information. For example, when the common result set is "the first US team showed a 40% increase in sales", the information retrieval module 232 validates the common result set with the sensitive information (actual number of sales and team/region names) to ensure correctness. Advantageously, the information retrieval module 232 validates the common result with the sensitive information to ensure accuracy, and avoid hallucinations.

In some instances, the common result set may not correlate with the sensitive information. In such instances, the information retrieval module 232 regenerates the common result set. For example, when the common result set is "the first US team showed a 40% increase in sales", but during validation with the sensitive information (actual number of sales and team/region names) the information retrieval module 232 identifies that North America (the sensitive information corresponding to the first US team) actually noted a sales increase of 10%, the common result set may be regenerated by selecting another set of responses from the plurality of responses which accurately reflect the enterprise data 214 in light of the user query 210. Alternatively, in such instances, the information retrieval module 232 may alter the common result set locally. With respect to the above example, the information retrieval module 232 may locally change the common result set to "the first US team showed a 10% increase in sales".

Further, the information retrieval module 232 generates the response based on the validated common result set. The information retrieval module 232 generates the response by supplementing the common result set (which has been validated previously) with the sensitive information. Advantageously, supplementing the plurality of responses with the sensitive information provides increased context to a complete (supplemented) response, ensuring accuracy. Moreover, when the information retrieval module 232 identifies that the response does not correlate with the sensitive information, the information retrieval module 232 may identify another response by validating the common result set, based on the sensitive information.

Upon generating the common result set, the information retrieval module 232 generates the user response by supplementing the response with the sensitive information. Considering the above example, the user response may be "the North American sales team showed a 10% increase in sales, reaching $25,000 in sales for FY24". The user response is provided to the user via the UI/UX module 206.

The persona module 234 validates the user, such that the user response is provided to the user only when the validation is successful. The persona module 234 is communicably coupled to the information retrieval module 232, and provides information pertaining to validation of the user to the information retrieval module 232. The persona module 234 fetches role information corresponding to the user from the enterprise data 214. Thereafter, the persona module 234 assesses if the user has access to information pertaining to the user query based on the persona rules 216. When it is assessed that the user is not supposed to have access to the user response, the persona module 234 may communicate a notification informing the user that they do not have access to requested information. For example, if a developer tries to access employment information from HR records of a coworker, the persona module 234 may send notification "you do not have access to this information".

The rules engine 236 is utilized for generating rules to prevent fraudulent activities in the enterprise. The rules engine 236 automatically identifies fraudulent patterns in the enterprise data 214, generates and executes respective processor-readable masking rules to avoid fraud. During pre-processing, the identification module 226 trains one or more classification models on fraud-related data such that the one or more classification models may identify patterns pertaining to fraudulent activities within the data. The one or more classification models may utilize any classification or pattern-recognition techniques for identifying patterns in the fraud-related data. The fraud-related data may be historic fraud-related data, real-time fraud-related data, fraud-related enterprise data from known fraud instances, fraud-related generic data, and the like. Patterns pertaining to fraudulent activities within the data may be expressed as anomalies in the data.

Alternatively, the identification module 226 may train the one or more classification models on fraud related data in real-time. Here, the training may be performed periodically, for example, each month, each week, every three months, every year, and the like. Advantageously, training the one or more classification models in real-time keeps the classification models updated with respect to known fraud events, new fraud patterns or techniques. This allows the classification models to stay informed on new fraud techniques, and identify patterns for generating one or more masking rules to counteract the fraud.

Since the rules engine 236 has access to the knowledge base 204, the rule engine 236 continuously processes the enterprise data 214. On identifying any fraud pattern, the rules engine 236 generates the one or more masking rules (logic) to counteract (and thereby, avoid) the fraud pattern. Here, the rules engine 236 utilizes the one or more classification models for identifying fraud patterns in the enterprise data 214. On identifying the fraud patterns, the rules engine 236 translates identified fraudulent patterns in the data into fraud-related logic. Further, the fraud-related logic may be mapped with historical occurrences of fraudulent activities to identify similar fraudulent occurrences historically. Counteracting logic from such historical similar fraudulent occurrences may be utilized for generating a counteracting logic for the present fraudulent activity.

The rules engine 236 may utilize one or more grid search techniques for generating the counteracting logic, and hence, the one or more masking rules. The grid search technique refers to processing data by intelligently applying vast amounts of permutations and combinations on the data in a hyperparameter search space. Examples of the grid search technique include utilizing at least one of a Bayesian optimization technique, a stochastic optimization technique, a tree-structured Parzen estimator (TPE) technique. In some instances, the rules engine 236 may utilize a trained foundation model, which has been previously trained on logic generation, to generate the counteracting logic. Here, generating the counteracting logic includes generation of rules conditions and actions by the trained foundation model. The rules engine 236 utilizes the rules conditions and actions to generate the one or more masking rules.

Thereafter, the rules engine 236 executes the one or more masking rules within the data processing system 114 to avoid fraud. For example, if fraud pattern noticed in overseas banking transactions, the rules engine 236 may generate the counteracting logic to flag future overseas banking transactions (following notice of fraudulent patterns in overseas banking transactions). In this regard, the rules engine 236 may execute a masking rule which requires the user to provide additional confirmation of identity for baking from overseas. Advantageously, timely detection of fraud and automated generation and execution of the masking rules ensures that future frauds are avoided, and that a fraudster is not able to take advantage of the data processing system 114.

The data processing system 114 may be utilized for masking data while utilizing foundation models in at least one domain including revenue and probability forecasting, medical claims management, healthcare fraud detection, talent acquisition and management, banking, financial portfolio management, intellectual property management, government projects, social service management, defense services management, and the like.

Figure 3:
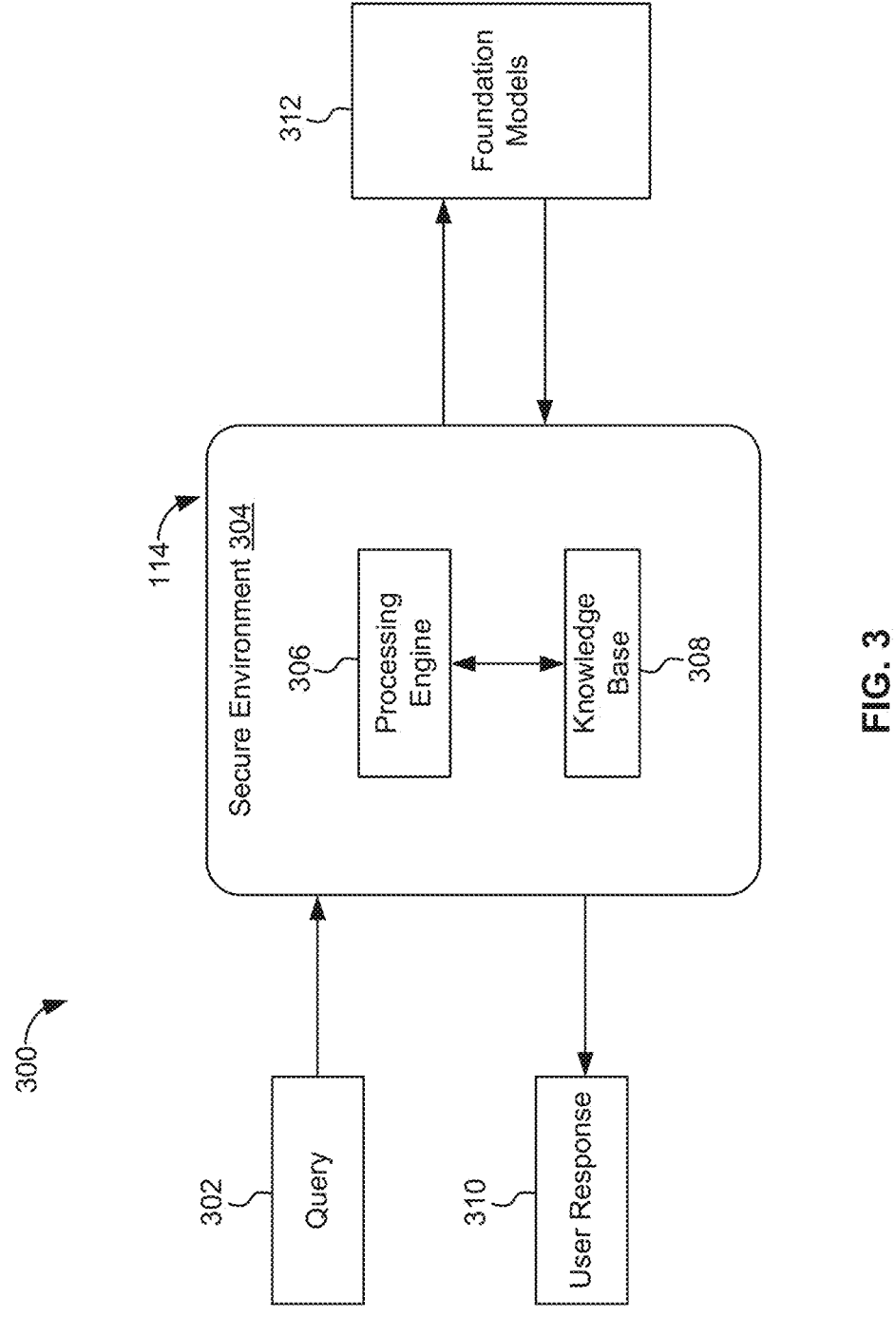
FIG. 3 depicts a block diagram showing a process flow of masking sensitive data from foundation models in accordance with implementations of the present disclosure.

FIG. 3 depicts a block diagram 300 showing a process flow of masking sensitive data from foundation models in accordance with implementations of the present disclosure.

The block diagram 300 illustrates a query 302 being fed into a secure environment 304. The query 302 refers to the user query provided by the user of the enterprise. The secure environment 304 refers to a controlled computational infrastructure configured to safeguard the sensitive information from unauthorized access or exposure, particularly in interactions involving third-party tools like foundation models 312. In this way, queries or prompts provided to the foundation models 312 have the sensitive information masked, and responses or model outputs received from the foundation models 312, also, do not include any sensitive information. The sensitive information is included in the model output to generate the user response 310 prior to being provided to the user.

As shown in FIG. 3, the query 302 is inputted into a secure environment 304, via the data processing system 114. The processing engine 208/306 and the knowledge base 204/308 are communicably coupled with each other, and comprised in the secure environment 304. The secure environment 304 may refer to an internal environment of the enterprise. Advantageously, the sensitive data pertaining to the enterprise is retained within the secure environment 304, and is masked from the foundation models 312.

The sensitive information is masked by the processing engine 306. The processing engine 306 masks the sensitive information by replacing the sensitive information with variables which retain contextual and relational relevance. In this way, the foundation models 312 provide accurate responses and avoid hallucinations in the foundation models 312 by sharing contextual and relational relevance between masked/secured sensitive data.

In an example, if the query 302 is "What market units are projected to have negative growth next quarter?", the query is provided to the secure environment 304. Within the secure environment 304, the processing engine 306 identifies the sensitive information by pre-processing the query. The sensitive data in the present query may be 'negative growth,' 'market units,' and 'quarter/year information.' Thereafter, the processing engine 306 masks the sensitive information and generates the plurality of responses, which are sent to the foundation models 312. The foundation models 312 generate a natural language response to the query 302, and share the same with the processing engine 306. Further, the processing engine 306 extracts relevant enterprise data 214 from the knowledge base 308 and supplements it within the response to generate the user response 310. The relevant enterprise data 214 may pertain to the sensitive data. In this way, the user response 310 may be "The Northeast, India, and ANZ market units are projected to have negative growth next quarter."

Figure 4:
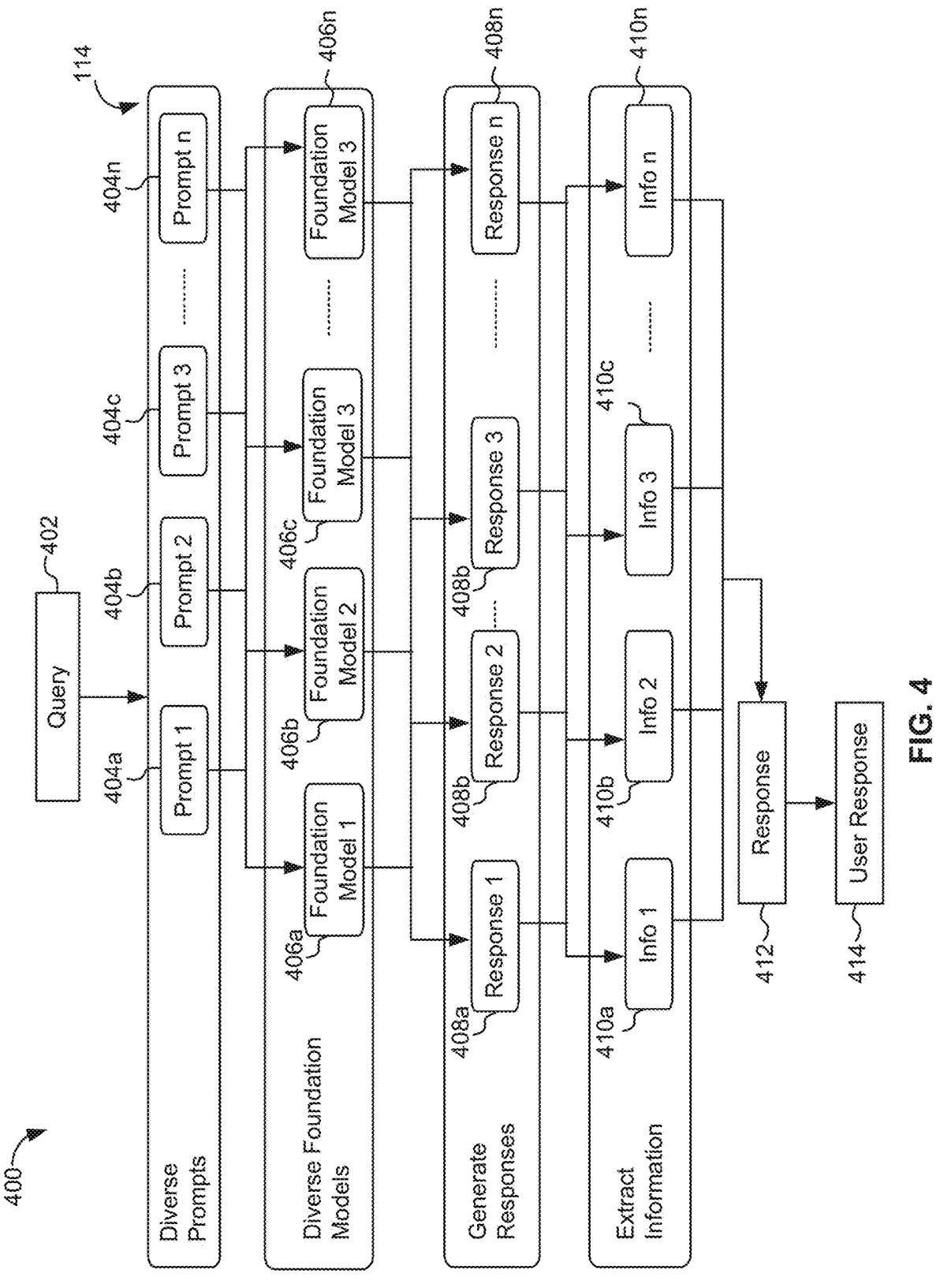
FIG. 4 depicts a block diagram showing an exemplary process flow of generating the user response from a user query in accordance with implementations of the present disclosure.

FIG. 4 depicts a block diagram 400 showing an exemplary process flow of generating the user response from a user query in accordance with implementations of the present disclosure.

As shown in FIG. 4, the data processing system 114 receives the query 402/302/210 from the user and processes the same to generate the response(es) 420/310/218. The user may be associated with the enterprises, as an employee, owner, dealer, vendor, and the like. Moreover, the query 402 may pertain to a request for information with respect to the enterprise. Additionally, the query can be framed (i.e., represented) in any natural language acknowledged by the data processing system 114.

Thereafter, the data processing system 114 generates a plurality of prompts 404a, 404b, 404c, . . . 404n based on the query 402 from the user. The plurality of prompts 404a, 404b, 404c, . . . 404n is generated by masking sensitive information in the query 402. In operation, the data processing system 114 substitutes the sensitive information in the query 402 with variables based on one or more masking criterion. The variables refer to symbols or placeholders that represent values or entities in at least one of mathematical, scientific, programming, and/or computing domain. Additionally, variables represent contextual and relational relevance with respect to the sensitive information. In this way, the foundation models 406a, 406b, 406c, . . . 406n have an accurate understanding of relational dependencies within the enterprise data 214, which leads to accurate responses, reducing hallucinations.

While masking, the data processing system 114 identifies and replace terminology belonging to a data-specific structure with explicit variable indicators that aligns with the enterprise data 214. In this regard, the data processing system 114 also considers for spelling errors and alternative names. In an example, if the query 402 is "For Nrth America what are the most dilutive market units to our revenue growth at fiscal year 2023?", a masked query may be represented as "For MarketX, what are the most dilutive market units to our revenue growth at fiscal year ValueX?". In this way, the plurality of foundation models which lack knowledge of details and structure of the hierarchies in the enterprise data 214 can correctly interpret relations of the sensitive information with the query 402. For example, the sensitive information pertaining to a client group "South CMT," may be understood as a Client Group segment by the plurality of foundation models.

The plurality of prompts 404a, 404b, 404c, . . . 404n refers to specific input queries/statements provided to the plurality of foundation models to generate the responses 408a, 408b, 408c, . . . 408n. The plurality of prompts 404a, 404b, 404c, . . . 404n serves as directives that guide the model in processing and producing relevant information based on the nature and structure of a prompt itself. In operation, the plurality of prompts 404a, 404b, 404c, . . . 404n includes numerous ways of representing the query 402.

When the plurality of foundation models 406a, 406b, 406c, . . . 406n is prompted with different versions of same query, chances of hallucinations reduce drastically. In an example, if the query 402 is "Which market has the highest revenue projection?", a first prompt 404a may be "The highest projected revenue was made for which market?", and a second prompt 404b may be "In which market would I expect the highest revenue?". In another example, if the query 402 is "Which client groups are responsible for driving the revenue growth of our three most impactful services in the North American market?", the first prompt may include the query 402 with an incorrect filter, the second prompt may include accurate query 402, and a third prompt may include the query 402 with an incorrect aggregation.

In response to inputting the plurality of prompts 404a, 404b, 404c, . . . 404n, the plurality of foundation models 406a, 406b, 406c, . . . 406n sends the plurality of responses 408a, 408b, 408c, . . . 408n to the data processing system 114. Thereafter, the data processing system 114 generates a common result set based on the plurality of responses 408a, 408b, 408c, . . . 408n. The common result set is a set of most common responses of the plurality of responses 408a, 408b, 408c, . . . 408n received from the plurality of foundation models 406a, 406b, 406c, . . . 406n. In some instances, the common result set may also be verified with the query 402.

Based on the common result set, enterprise information 410a, 410b, 410c, . . . 410n pertaining to each of the plurality of responses 408a, 408b, 408c, . . . 408n of the common result set is extracted from the knowledge base 204/308 associated with the data processing system 114. The enterprise information may include the sensitive information. In an example, if the query 402 pertains to revenue growth in different markets, and the first prompt includes the query 402 with the incorrect filter, a first information may pertain to revenue growth in regions of 'Midwest RES, Northeast H&PS'; if the second prompt includes the accurate query 402, a second information may pertain to revenue growth in regions of 'South RES, Midwest PRD, Canada RES'; and if the third prompt includes the query 402 with incorrect aggregation, a third information may pertain to revenue growth in regions of 'Canada H&PS, Canada RES, South RES'.

The data processing system 114 generates a response 412 by validating the common result set with the sensitive information and the query 402. In this regard, the data processing system 114 executes each of the responses of the plurality of responses 408a, 408b, 408c, . . . 408n in a virtual environment by appending (i.e., including) the sensitive information within the responses 408a, 408b, 408c, . . . 408n. In this way, the responses 408a, 408b, 408c, . . . 408n are vetted against the query 402 and the enterprise information 410a, 410b, 410c, . . . 410n to ensure accuracy.

The virtual environment refers to a simulated/software-based environment which mimics real-world functionality. The virtual environment enables testing and deployment of potential real-world actions, without having to implement them in the real world. This advantageously increases accuracy without compromising on increasing involvement of computational resources. Since this is performed in a virtual environment, learnings from the validation may be utilized to select and improve the response 412. In this way, the responses 408a, 408b, 408c, . . . 408n are executed by validating the response 412 with respect to the data repository (knowledge base) and the query 402.

In some instances, each of the responses 408a, 408b, 408c, . . . 408n are provided a score based on respective accuracy when executed. Based on which response got a highest score compared to other responses from the plurality of responses 408a, 408b, 408c, . . . 408n, the 20 response 412 is selected.

Thereafter, data processing system 114 generates a user response 414 by supplementing the response 412 with the sensitive information. The term 'supplementing' refers to substituting the masked or otherwise obscured data with the original sensitive data or including the sensitive information in the response 412, or adjusting the response 412 in light of the sensitive information. The data processing system 114 provides the user response 414 to the user, based on the validation.

Prior to providing the user response 414 to the user, the data processing system 114 validates the user based on one or more predefined criteria. The one or more predefined criteria refers to specific conditions or requirements set by the enterprise to verify the user's eligibility or authorization. The one or more predefined criteria pertains to a persona of the user. The persona refers to a profile or characterization of the user based on attributes such as role, preferences, behavior, or other distinguishing factors. The persona information comprises role, location, orientation, ethnicity, team, group, and the like.

Since the data processing system 114 is communicably coupled to the knowledge base 204/308, it has constant access to persona or role-based information for each user associated with the enterprise (and, in extension, the data processing system 114). In this regard, the data processing system 114 validates the query 402 and the user response 414 with respect to one or more persona rules. The persona rules refer to guidelines or criteria established based on user roles or profiles within the enterprise, ensuring that queries 402 and user responses 414 adhere to specified standards or permissions. For example, a persona rule may dictate which department, or hierarchical roles have access to certain information pertaining to the enterprise, like employment records.

In this regard, the data processing system 114 shares the user response 414 with the user when the user is allowed to access relevant information pertaining to the query 402 and the user response 422. Alternatively, when the user is not allowed to access information, the data processing system 114 shares a notification with the user informing them that they do not have access to this information. The level of facilitation of the sensitive data in the user response 414 may depend upon the persona information so that the user role/privilege is considered by producing the user response 414 from the selected response 412. Therefore, different user responses corresponding to multiple personas may be generated from the same selected response 412.

Additionally, the user response 414 may be provided to the user based on one or more masking rules. The masking rules refer to specific rules which, on execution, add another level of security by masking the sensitive data and protecting against fraudulent activities. In this regard, the data processing system 114 identifies patterns in the enterprise data 214 associated with the data processing system 114. The patterns refer to a recognizable sequence or behavior indicative of fraudulent activities aimed at unlawfully obtaining sensitive information. These patterns typically involve repeated methods or tactics used to exploit vulnerabilities in security systems or protocols, allowing unauthorized access to confidential data.

The data processing system 114 generates the one or more masking rules based on the patterns identified. For example, if it is identified that fraudsters are logging into and emptying accounts of bank customers via overseas banking, then the masking rule may be implemented to verify user identification based on biometric information or a secret security question. Advantageously, the data processing system 114 automatically executes the one or more masking rules to ascertain increased security. This, in turn, saves costs and time since the process for generating and executing the masking rules is typically a time-intensive process requiring manual intervention by domain specific matter experts.

Figure 5:
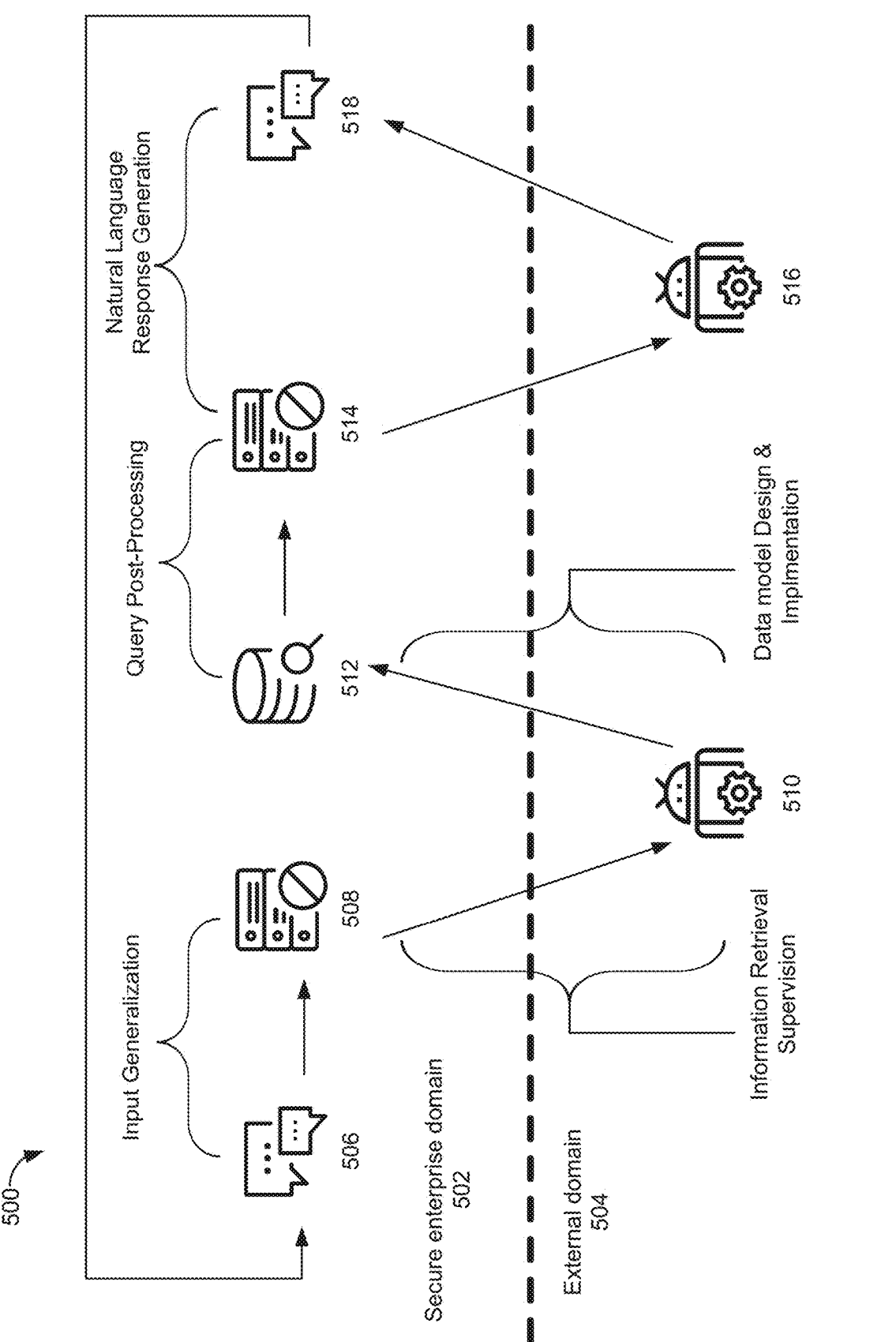
FIG. 5 depicts a detailed process flow of masking sensitive data during information retrieval in accordance with implementations of the present disclosure.

FIG. 5 depicts a detailed process flow 500 of masking sensitive data during information retrieval in accordance with implementations of the present disclosure.

As shown in FIG. 5, the process flow 500 of masking sensitive data during information retrieval is implemented utilizing two or more domains, simultaneously. These domains, namely a secure enterprise domain 502 (also referred to as the secure environment 304 previously), and an external domain 504 enable appropriate functioning of solutions presented in the present disclosure. By utilizing two or more domains in accordance with implementations of the present disclosure, sensitive enterprise data is securely stored within the secure enterprise domain 502, leading to enhanced data protection measures and ensuring compliance with stringent security protocols.

The data processing system 114 performs steps iterated with respect to the secure enterprise domain 502, and the plurality of foundation models 312/408a-408n perform steps iterated with respect to the external domain. In some instances, the plurality of foundation models 312/408a-408n are implemented as generative artificially intelligent (Generative AI or Gen AI) models. In such instances, the plurality of foundation models 312/408a-408n may employ prompt engineering techniques for accuracy. The term "prompt engineering" refers to a process of designing/crafting effective prompts/queries that elicit desired responses from artificial intelligence systems. This involves structuring prompts to optimize the understanding and accuracy of responses, often tailored to specific tasks or applications. The prompt engineering techniques may be implemented as a few-shot prompting technique.

Additionally, FIG. 5 also represents sub-processes within the process flow 500, with one or more steps of the process flow 500 being part of at least one sub-process. These sub-processes are iterated as an input generalization sub-process, a data model design and implementation sub-process, an information retrieval supervision sub-process, a query post-processing sub-process, and a natural language response generation sub-process.

At step 506, the user provides the query to the data processing system 114 via the UI/UX module 206. In some instances, the user may provide the query via a chatbot hosted by the UI/UX module 206. Thereon, under the input generalization sub-process at step 508, the data processing system 114 masks the sensitive information in the query and prepares the plurality of prompts for the plurality of foundation models. During masking, numeric values may be supplemented with contextual variables, textual values may be replaced by generalized terms, and the like, to appropriately mask the sensitive information.

The plurality of foundation models receives the plurality of prompts from the data processing system 114. At step 510, under the information retrieval supervision sub-process, at least one foundation model of the plurality of foundation models generates multiple instances of information retrieval queries for retrieving relevant enterprise data (or, enterprise information) from the knowledge base 204. The knowledge base 204 may be implemented as at least one of a vector database, a structured query language (SQL) database, a not only structured query language (no-SQL) database, and the like. The relevant enterprise data may also be masked to secure the sensitive information present in the enterprise data 214.

Further, under the data model design and implementation sub-process, the information retrieval queries are then provided to the data processing system 114, which further utilizes the information retrieval queries to extract the enterprise data from the knowledge base 204. At step 512, the data processing system 114 unmasks the information retrieval queries to extract the enterprise data 214 from the knowledge base 204. In some instances, extracted enterprise data 214 is stored locally at the knowledge base 204 for further processing.

At step 514, under the query post-processing sub-process, the data processing system 114 masks the sensitive information from the query to generate the plurality of prompts pertaining to the query. These prompts are written in distinctive styles and manners with respect to the query (the same query) to get multiple data points from the plurality of foundation models. This advantageously assists in ensuring accuracy of the response. The data processing system 114 provides the plurality of prompts to the plurality of foundation models.

Thereafter, at step 516, under the natural language response generation sub-process, the plurality of foundation models generates the plurality of responses in reply to the plurality of prompts. Notably, the plurality of responses is generated based on the query, the information retrieval queries, and masked enterprise data 214. The plurality of foundation models provides the plurality of responses to the data processing system 114.

At step 518, the data processing system 114 unmasks the response and shares the same with the user, via the UI/UX module 206.

It will be appreciated that the data processing system 114 is configured to hold multiple conversations with the user, often over various dialogues. In this way, the process illustrated in FIG. 5 will continually repeat, based on interactions with the user.

FIG. 6 is a flow diagram presenting an exemplary method 600 in accordance with implementations of the present disclosure. In some implementations, the method 600 may be executed within the data processing system 114 as described in relation to FIG. 2.

At step 602, a query is received from the user. The user may pertain to a user of the enterprise. In some instances, the user may be employed with the enterprise. In other instances, the user may be a dealer, customer, vendor, and the like, related to the enterprise. The query pertains to a request for information. The information requested may pertain to the enterprise. Additionally, the query may include or relate to sensitive information pertaining to the enterprise.

At step 604, the plurality of prompts is generated based on the query from the user. The plurality of prompts is generated to fetch appropriate responses from the plurality of foundation models. Additionally, the plurality of prompts is generated by masking the sensitive information in the query. The sensitive information may relate to enterprise data 214 that, if disclosed or compromised, could potentially harm an individual, organization, or system, leading to privacy breaches, economic loss, or reputational damage. The data processing system 114 may generate the plurality of prompts corresponding to the query, each prompt being variably composed. This process ensures comprehensive coverage of potential responses tailored to diverse contextual interpretations of the query.

At step 606, a plurality of responses is received from the plurality of foundation models. The plurality of responses is received in response to inputting the plurality of prompts. The plurality of foundation models may employ deep learning techniques, such as transformer architectures, to generate the plurality of responses by processing the plurality of prompts derived. The plurality of foundation models may leverage pre-trained weights and contextual embeddings to generate diverse and contextually appropriate responses, adapting their outputs based on the semantic nuances embedded within each prompt.

At step 606, a common result set is generated based on the plurality of responses. This involves aggregating the plurality of responses and verifying their consistency and relevance with each other, ensuring that the final set comprehensively addresses diverse contextual interpretations of the query.

At step 610, a response is generated by validating the common result set with the sensitive information and the query. This validation involves augmenting the response with the sensitive information and verifying it against the enterprise data 214 and the query (original). If discrepancies or inaccuracies are detected, the response is regenerated to maintain coherence and accuracy.

At step 612, a user response is generated by supplementing the response with the sensitive information. In some instances, the sensitive information is directly appended within the response. In other instances, the response may be adjusted to align with the sensitive information. Advantageously, this ensures comprehensive and contextually appropriate communication with the user while maintaining data integrity and confidentiality.

At step 614, the user response is provided to the user in response to the query. Advantageously, the method 600 enables secure, precise, efficient, and dependable information retrieval, thereby achieving heightened accuracy.

Figure 7:
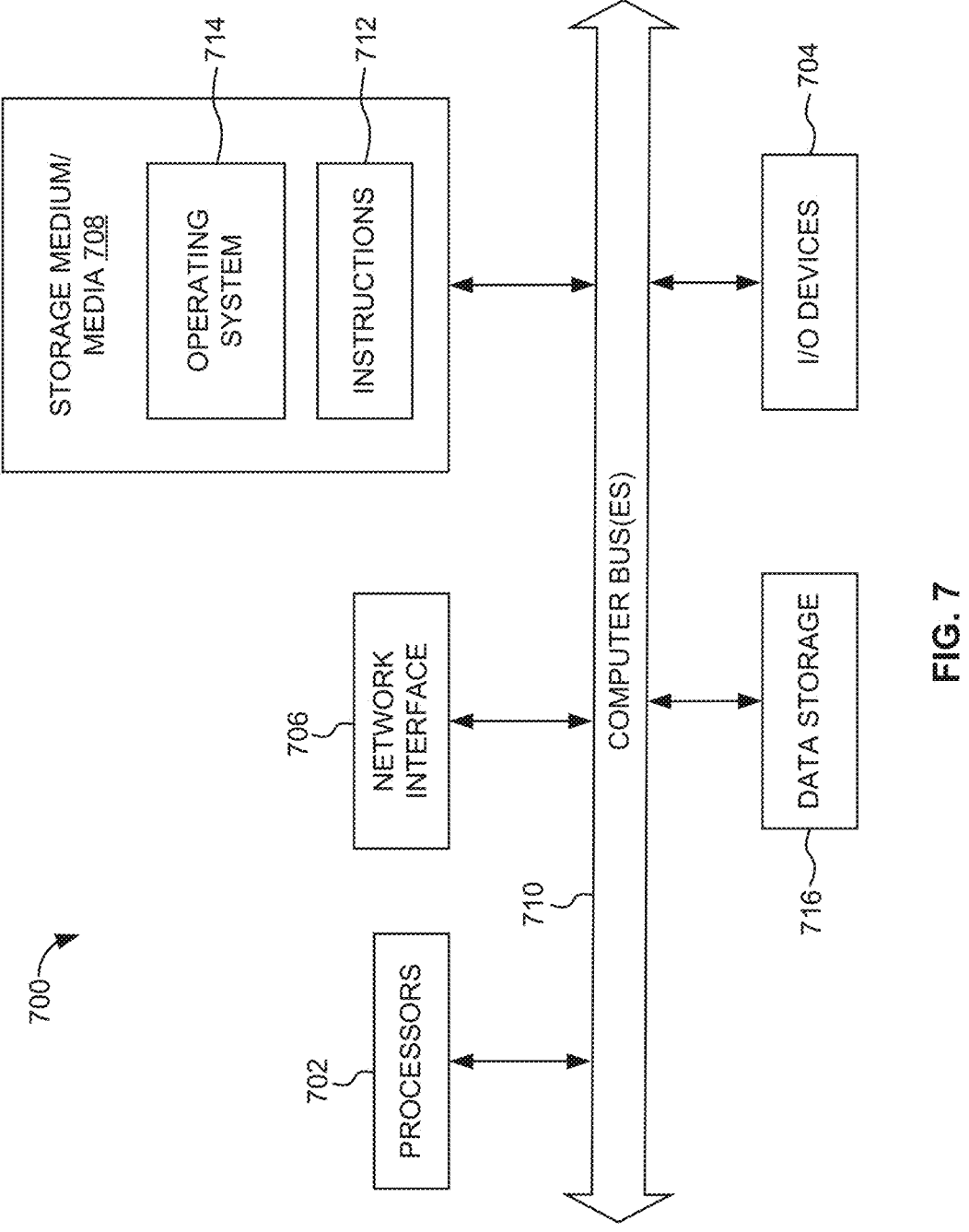
FIG. 7 illustrates a computer system that may be used to implement the knowledge system.

FIG. 7 illustrates a computer system 700 that may be used to implement the data processing system 114. More particularly, computing machines such as desktops, laptops, smartphones, tablets, and wearables which may be used to process the conversational interactions in the data processing system 114 may have the structure of the computer system 700. The computer system 700 may include additional components not shown and that some of the process components described may be removed and/or modified. In another example, a computer system 700 may be deployed on external-cloud platforms such as cloud, internal corporate cloud computing clusters, organizational computing resources, and/or the like.

The computer system 700 includes processor(s) 702, such as a central processing unit, ASIC or another type of processing circuit, input/output devices 704, such as a display, mouse keyboard, etc., a network interface 706, such as a Local Area Network (LAN), a wireless 802.11x LAN, a 3G or 4G mobile WAN or a WiMax WAN, and a processor-readable medium 708. Each of these components may be operatively coupled to a bus 710. The computer-readable medium 708 may be any suitable medium that participates in providing instructions to the processor(s) 702 for execution. For example, the computer-readable medium 708 may be non-transitory or non-volatile medium, such as a magnetic disk or solid-state non-volatile memory or volatile medium such as RAM. The instructions or modules stored on the computer-readable medium 708 may include machine-readable instructions 712 executed by the processor(s) 702 that cause the processor(s) 702 to perform the methods and functions of the data processing system 114.

The data processing system 114 may be implemented as software stored on a non-transitory processor-readable medium and executed by the processors 702. For example, the computer-readable medium 708 may store an operating system 714, such as MAC OS, MS WINDOWS, UNIX, or LINUX, and code for the data processing system 114. The operating system 714 may be multi-user, multiprocessing, multitasking, multithreading, real-time, and the like. For example, during runtime, the operating system 714 is running and the code for the data processing system 114 is executed by the processor(s) 702.

The computer system 700 may include a data storage 716, which may include non-volatile data storage. The data storage 716 stores any data used or generated by the data processing system 114.

The network interface 706 connects the computer system 700 to internal systems for example, via a LAN. Also, the network interface 706 may connect the computer system 700 to the Internet. For example, the computer system 700 may connect to web browsers and other external applications and systems via the network interface 706.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations of the present disclosure provide multiple technical improvements and address drawbacks of traditional foundation models. For example, implementations of the present disclosure provide accurate retrieval of information using the foundation model for responding to the user query. Such accuracy directly leads to improved performance of the foundation model, while ensuring data privacy by masking sensitive information from the foundation model. This accuracy leads to efficient, economic, and correct responses from the foundation model, drastically reducing chances of hallucinations.

Moreover, by intelligently masking sensitive information while preserving contextual and relational nuances within the data, the invention enhances the accuracy of responses generated by foundation models. This approach eliminates the need for internal domain experts to manually oversee security measures, thus optimizing computational efficiency. The retained relational context of masked data not only ensures more precise responses but also reduces the occurrence of misleading information retrieval, thereby mitigating risks associated with data inaccuracies, such as hallucinations. Additionally, the intelligent protection of sensitive data safeguards enterprises against potential fraud, reinforcing data security and compliance with regulatory standards.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:
1. A data processing system, comprising:
   at least one hardware processor; and at least one non-transitory processor-readable medium storing instructions executed by the at least one processor to:

receive a query from a user, wherein the query pertains to a request for information;

generate a plurality of prompts based on the query from the user, wherein the plurality of prompts is generated by masking sensitive information in the query;

receive a plurality of responses from a plurality of foundation models in response to inputting the plurality of prompts;

generate a common result set based on the plurality of responses;

generate a response by validating the common result set with the sensitive information and the query;

generate a user response by supplementing the response with the sensitive information; and provide the user response to the user in response to the query.

2. The data processing system of claim 1, wherein the query is framed in a natural language.

3. The data processing system of claim 1, wherein the instructions for providing the user response cause the at least one processor to:

validate the user based on one or more predefined criteria, wherein the one or more predefined criteria pertain to a persona of the user; and provide the user response to the user in response to the query, based on the validation.

4. The data processing system of claim 1, wherein the instructions for masking sensitive data in the query cause the at least one processor to:

substitute the sensitive information in the query with variables based on one or more masking criterion, wherein the variables represent contextual and relational relevance with respect to the sensitive information.

5. The data processing system of claim 1, wherein the at least one non-transitory processor-readable medium comprises a data repository associated with the data processing system, wherein information in the data repository is represented across hierarchies and incorporates domain terminology.

6. The data processing system of claim 5, wherein the instructions for masking the sensitive data in the user response cause the at least one processor to:

map the domain terminology to the plurality of foundation models.

7. The data processing system of claim 1, wherein the instructions for generating the common result set cause the at least one processor to:

execute, in a virtual environment, each of the responses by appending the sensitive information within the responses, wherein the responses are executed by validating the response with respect to the data repository and the query; and select the response based on the result of the validation.

8. The data processing system of claim 1, wherein the instructions for providing the user response are based on one or more masking rules, wherein the one or more masking rules cause the at least one processor to identify and mask the sensitive information based on the one or more masking rules, wherein the one or more masking rules comprise rules pertaining to masking of the sensitive data.

9. The data processing system of claim 8, wherein the instructions for providing the user response based on the one or more masking rules cause the at least one processor to:

identify patterns in data associated with the data processing system, wherein the patterns pertain to fraudulent activities;

generate the one or more masking rules based on the patterns identified; and execute processor-readable instructions pertaining to the one or more masking rules.

10. A processor-executable method comprising:

receiving, by a processor, a query from a user, wherein the query pertains to a request for information;

generating, by the processor, a plurality of prompts based on the query from the user, wherein the plurality of prompts is generated by masking sensitive information in the query;

receiving, by the processor, a plurality of responses from a plurality of foundation models in response to the plurality of prompts;

generating, by the processor, a common result set based on the plurality of responses;

generating, by the processor, a response by validating the common result set with the sensitive information and the query;

generating, by the processor, a user response by supplementing the response with the sensitive information; and providing, by the processor, the user response to the user in response to the query.

11. The processor-executable method of claim 10, wherein the query is framed in a natural language.

12. The processor-executable method of claim 10, wherein the instructions for providing the user response comprise:

validating, by the processor, the user based on one or more predefined criteria, wherein the one or more predefined criteria pertain to a persona of the user; and providing, by the processor, the user response to the user in response to the query, based on the validation.

13. The processor-executable method of claim 10, wherein the instructions for masking sensitive data in the query comprise:

substituting, by the processor, the sensitive information in the query with variables based on one or more masking criterion, wherein the variables represent contextual and relational relevance with respect to the sensitive information.

14. The processor-executable method of claim 10, wherein information in a data repository associated with the processor is represented across hierarchies and incorporates domain terminology, wherein the instructions for masking the sensitive data in the user response comprise:

mapping, by the processor, the domain terminology to the plurality of foundation models.

15. The processor-executable method of claim 10, wherein the instructions for generating the common result set comprise:

executing, by the processor, each of the responses in a virtual environment by appending the sensitive information within the responses, wherein the responses are executed by validating the response with respect to the data repository and the query; and selecting, by the processor, the response based on the result of the validation.

16. The processor-executable method of claim 10, wherein the instructions for providing the user response are based on one or more masking rules, wherein the one or more masking rules cause the at least one processor to identify and mask the sensitive information based on the one or more masking rules, wherein the one or more masking rules comprise rules pertaining to masking of the sensitive data.

17. The processor-executable method of claim 10, wherein the instructions for providing the user response based on the one or more masking rules comprise:

identifying, by the processor, patterns in data associated with the data processing system, wherein the patterns pertain to fraudulent activities;

generating, by the processor, the one or more masking rules based on the patterns identified; and executing, by the processor, processor-readable instructions pertaining to the one or more masking rules.

18. A non-transitory processor-readable storage medium comprising machine-readable instructions that cause a processor to:

receive a query from a user, wherein the query pertains to a request for information;

generate a plurality of prompts based on the query from the user, wherein the plurality of prompts is generated by masking sensitive information in the query;

receive a plurality of responses from a plurality of foundation models in response to inputting the plurality of prompts;

generate a common result set based on the plurality of responses;

generate a response by validating the common result set with the sensitive information and the query;

generate a user response by supplementing the response with the sensitive information; and provide the user response to the user in response to the query.

19. The non-transitory processor-readable storage medium of claim 18, wherein the instructions for providing the user response cause the at least one processor to:

validate the user based on one or more predefined criteria, wherein the one or more predefined criteria pertain to a persona of the user; and provide the user response to the user in response to the query, based on the validation.

20. The non-transitory processor-readable storage medium of claim 18, wherein the instructions for masking sensitive data in the query cause the at least one processor to:

substitute the sensitive information in the query with variables based on one or more masking criterion, wherein the variables represent contextual and relational relevance with respect to the sensitive information.

* * * * *